Jan. 9, 1923.
C. W. CRANNELL.
IRRIGATION PUMP.
FILED JULY 29, 1921.
1,441,833.
5 SHEETS—SHEET 4.
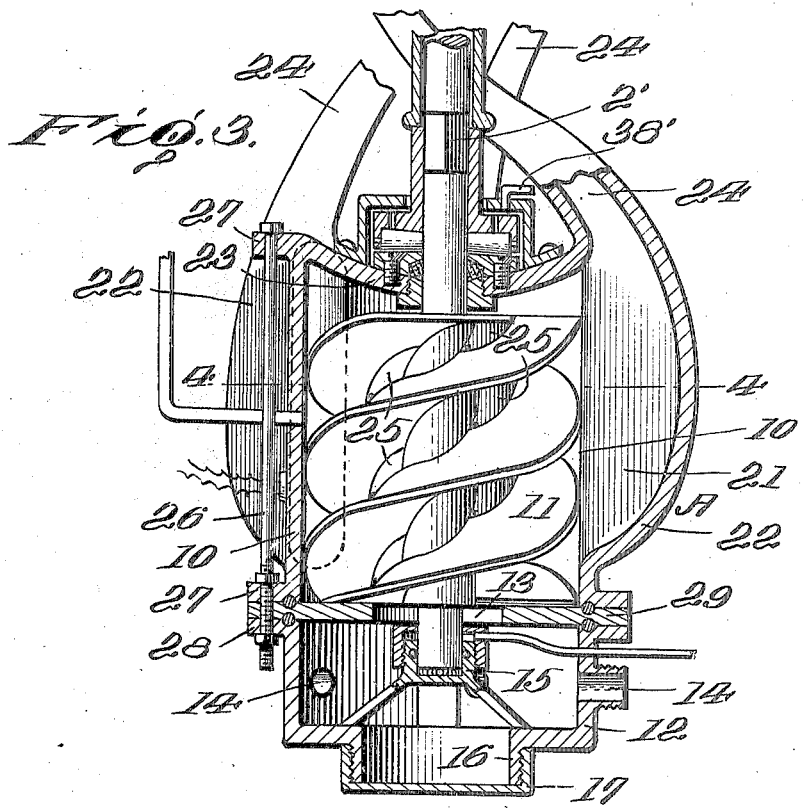
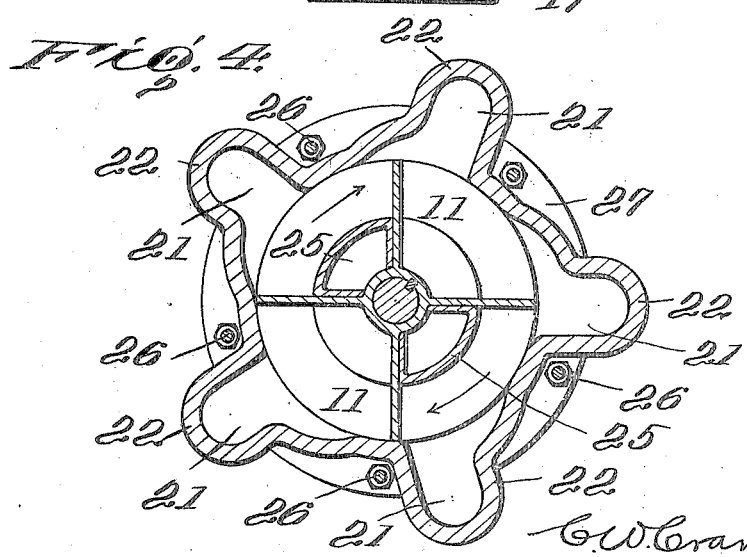
Inventor
C. W. Crannell
By A. S. Pattison
Attorney

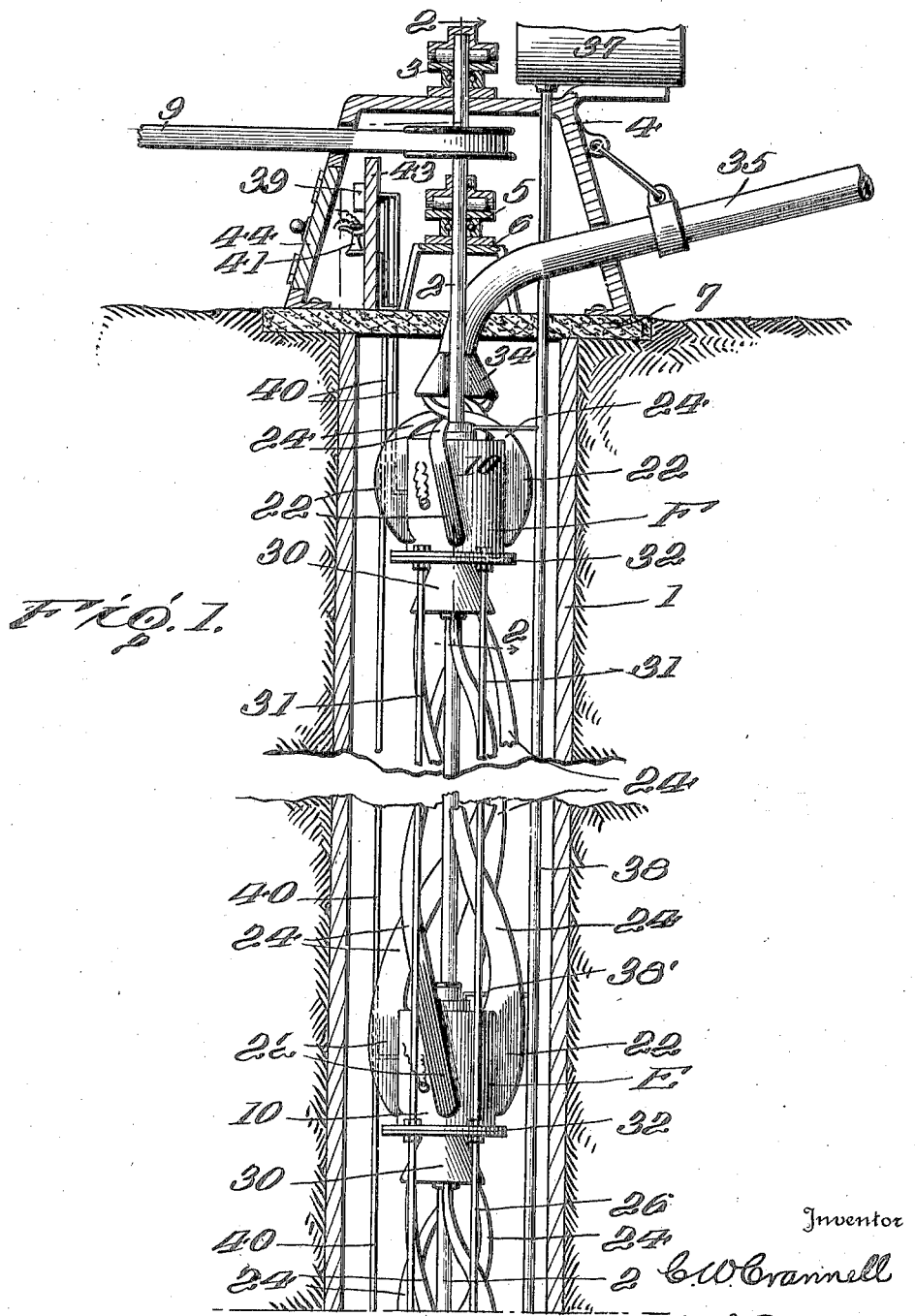

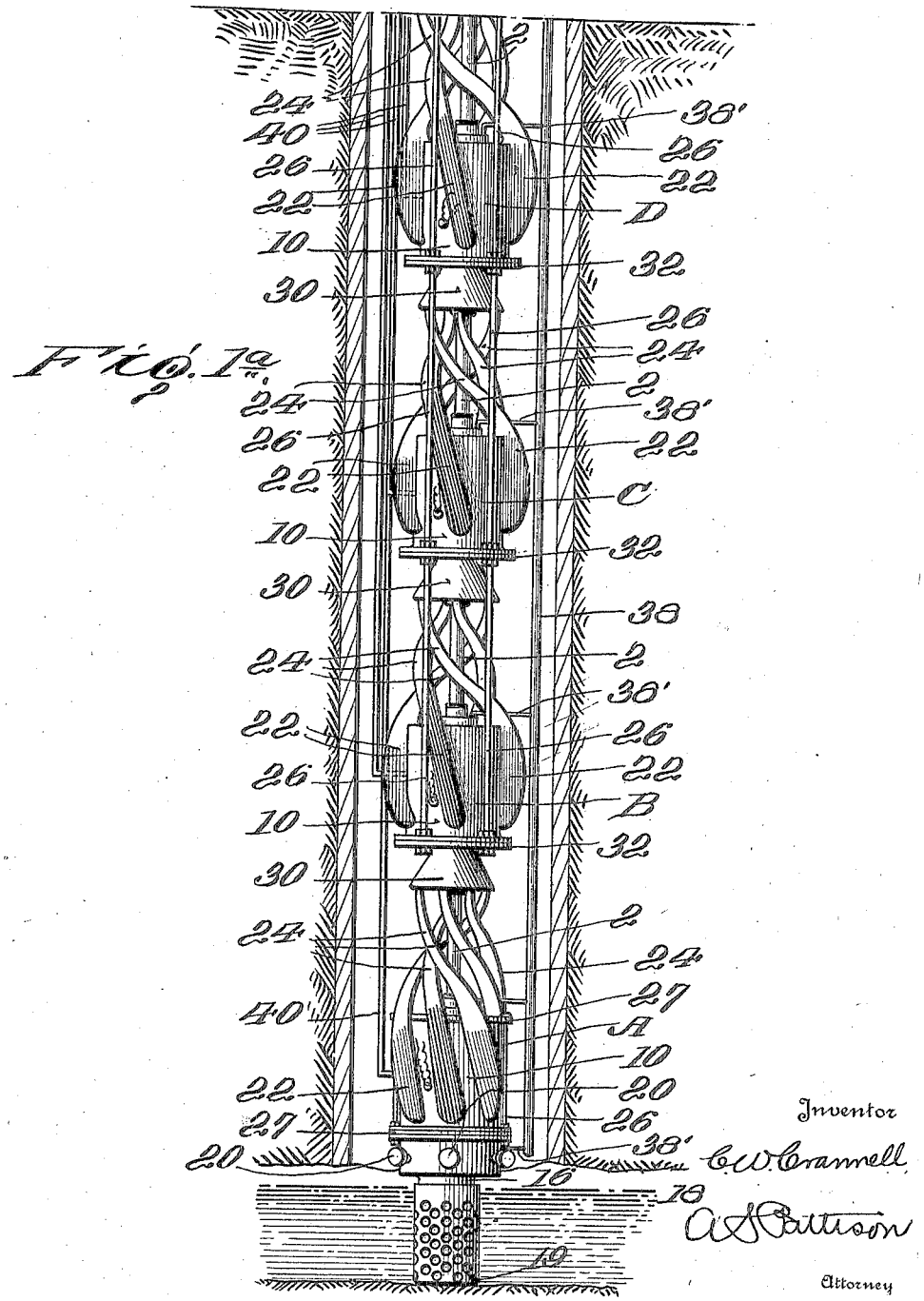

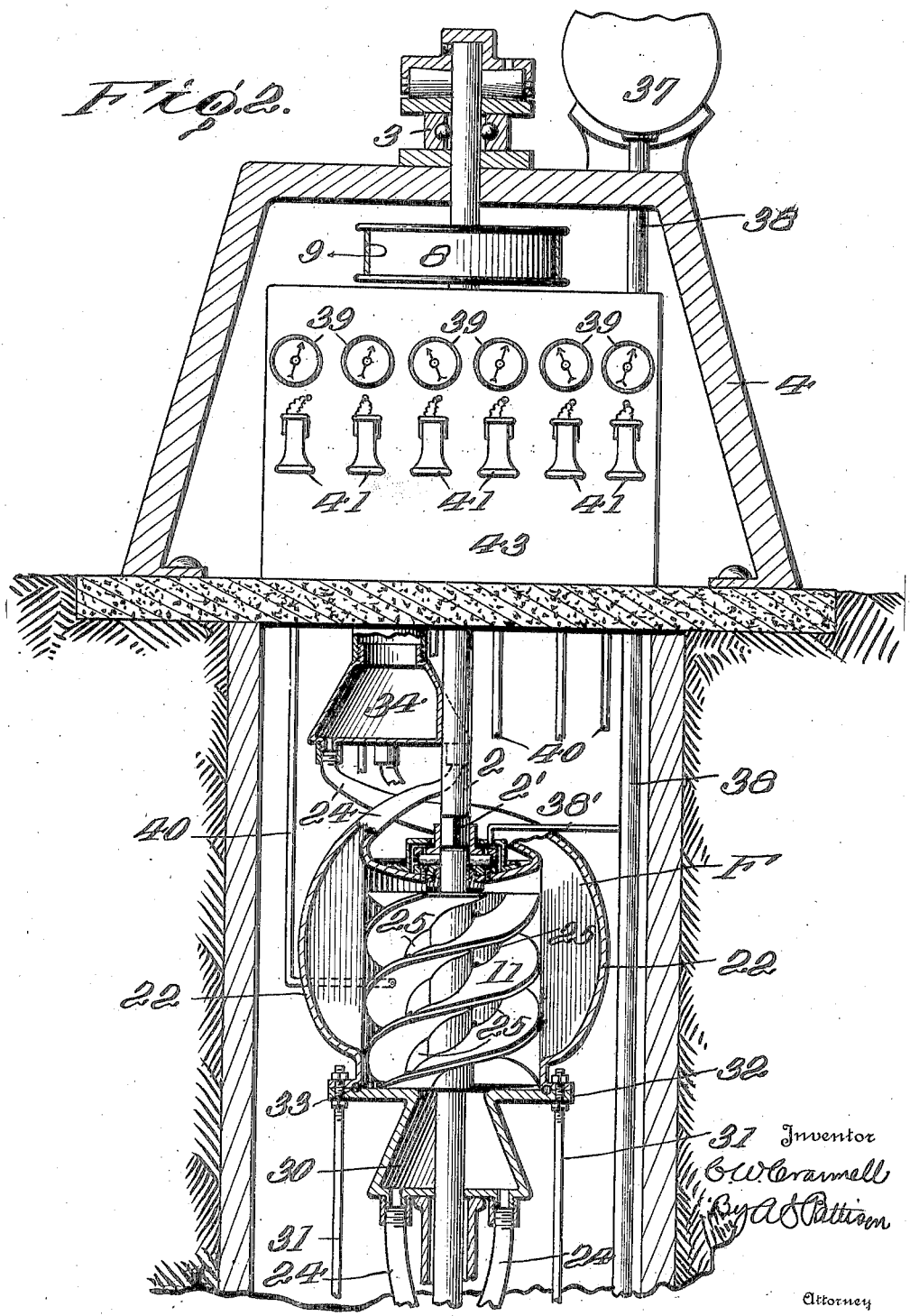

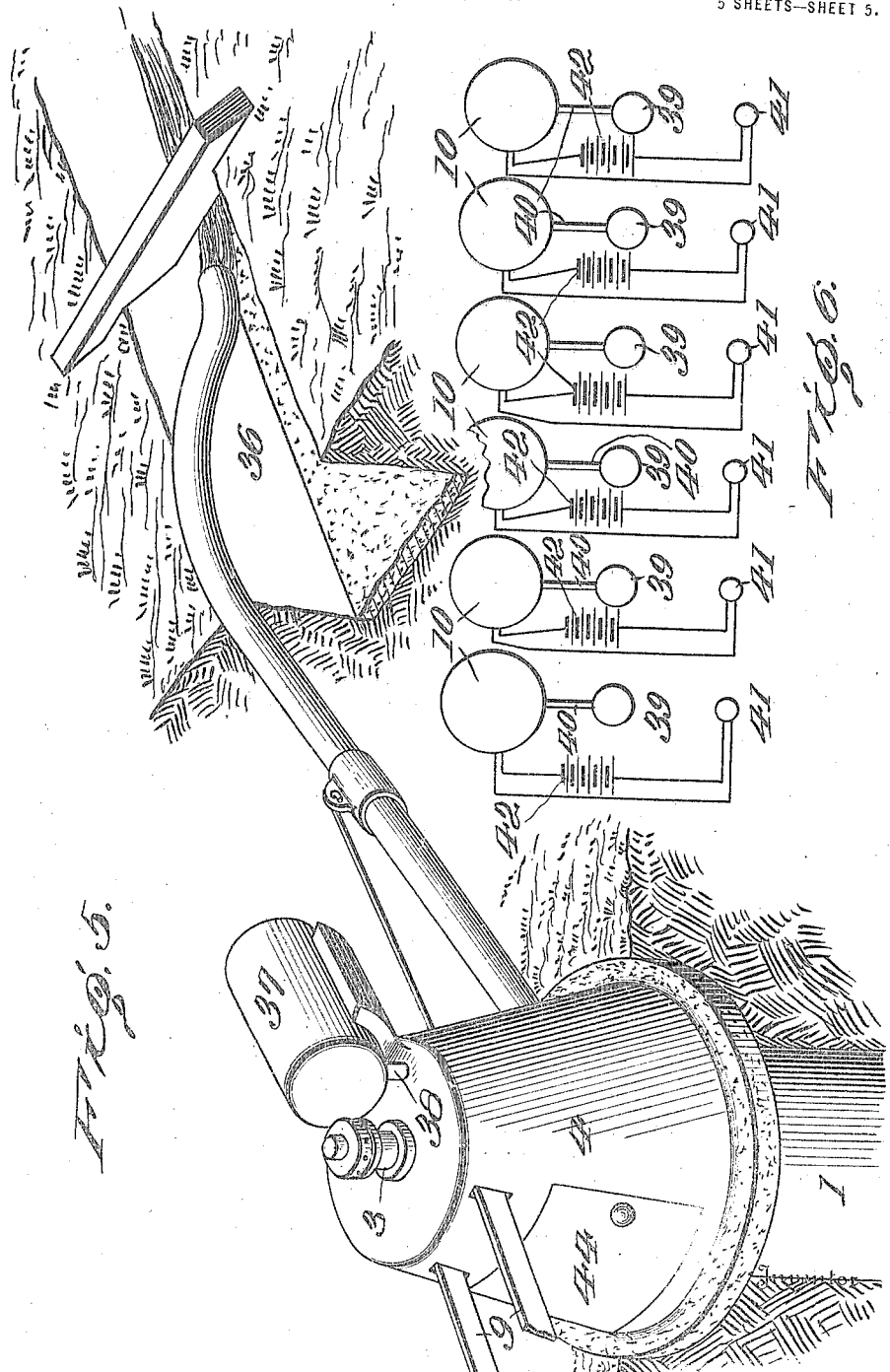

Patented Jan. 9, 1923.

1,441,833

UNITED STATES PATENT OFFICE.

CHARLES W. CRANNELL, OF CHAPPELL, NEBRASKA, ASSIGNOR OF ONE-HALF TO RILEY R. BARNES, OF CHAPPELL, NEBRASKA.

IRRIGATION PUMP.

Application filed July 29, 1921. Serial No. 488,336.

*To all whom it may concern:*

Be it known that I, CHARLES W. CRANNELL, a citizen of the United States, residing at Chappell, in the county of Deuel and State of Nebraska, have invented certain new and useful Improvements in Irrigation Pumps, of which the following is a specification, reference being had therein to the accompanying drawing.

My invention relates to improvements in irrigation pumps, the primary object of which is to provide a pump which will require a relatively low motive power for operating it.

Heretofore, various types of pumps have been devised for use as irrigation pumps and particularly the centrifugal type of pump. This type of pump has been found to require a large amount of power relative to the pumping capacity and they have proven unsatisfactory.

A further object of my invention is to provide a plurality of screw-pumps throughout the depth of the well, which are simultaneously operated and one pump forcing the water to the pump or pumps above and finally delivering it to the desired irrigation point.

A further object of my invention is to provide a plurality of pumps operated by a common shaft which extends through the depth of the well, the pumps located at various points from the bottom to substantially the top of the well, the pumps located distances apart increasing from the bottom to the top of the well.

Another object of my invention is to provide a pump for irrigation purposes, which comprises a plurality of screw-pumping mechanisms, which are placed in communication through spirally arranged tubes between the several pumping mechanisms.

Another object of my invention is to provide a pump for irrigation purposes, comprising a plurality of screw-like pumping mechanisms located at various points throughout the well and simultaneously operated, each pumping mechanism having a plurality of spirally arranged outlets and spirally arranged tubes communicating the outlets of one mechanism with the inlets of the pumping mechanism above.

Another object of my invention is to provide a pump for irrigation purposes, comprising a plurality of screw-like pumping mechanisms arranged throughout the depth of the well and simultaneously operated, the lowest pumping mechanism having a greater number of outlet openings in communication with the pump above than the upper pumps have, whereby the increased capacity is obtained.

Another object of my invention is to provide means for indicating separately the pumping pressure of the several pumping mechanisms, so that the pumping efficiency of one of the mechanisms can at all times be ascertained.

Another object of my invention is to provide an irrigation pump, consisting of a plurality of pumping mechanisms located throughout the depth of the well and simultaneously operated, combined with a separate telephone communication with the various mechanisms so that any difficulty in the operation of the system can be readily detected and located.

Another object of my invention is to provide a pump for irrigation purposes, comprising a plurality of pumping mechanisms and means for providing lubrication for the lower pumping mechanism which will be circulated and distributed throughout the several pumping mechanisms.

Other objects of my present invention will appear from the disclosure and the following description.

In the accompanying drawings:—

Figure 1 is a vertical section of the upper end of a well, showing the upper part of my improved pump in side elevation.

Fig. 1ª is a similar view of the well below that shown in Fig. 1, with my improved pumping mechanism in position.

Fig. 2 is an enlarged vertical section of the upper pumping mechanism, showing it in position in the upper end of the well and showing in side elevation the pressure gauges and telephone receivers.

Fig. 3 is a vertical section of my lower pumping mechanism.

Fig. 4 is a transverse section on the line 4—4 of Fig. 3.

Fig. 5 is a perspective view showing the housing around the upper end of my improved pump.

Fig. 6 is a diagrammatic view showing the telephone communication with the several pumping mechanisms.

Referring now to the drawings, 1 indicates the well. Passing throughout the length of the well is an operating shaft 2. This shaft 2 has its upper end suitably journaled as at 3, on the top of a housing 4, which is placed over and encloses the top of the well. The shaft further has suitable bearings 5, within the housing 4, which are supported by a suitable bracket or truss 6, extending from a suitable bottom or base 7 of the housing 4.

Arranged throughout, common to the operating shaft 2, are pumping mechanisms A, B, C, D, E and F. All of these pumping mechanisms are common to and operated by the shaft 2, and the upper end of the shaft 2 carries a suitable pulley 8, around which a driving belt 9 passes. This shaft may be driven by any suitable power.

Referring now to the lowest pumping mechanism A, which comprises a barrel 10 in which is located a screw-pumping mechanism 11. This pumping mechanism 11 is suitably operatively connected with the shaft 2. This shaft 2 may be made in sections, the ends of the sections made angular as at 2′, to interlock with the screw-pumping mechanism 11. The lower pumping mechanism 11 is provided with a housing 12, at its lower end with which communicates the screw barrel 10 through a suitable opening 13, the housing 12 having suitable water inlets 14, of which there may be any desired number. This housing 12 carries a bearing 15 of any suitable construction for the lower pumping mechanism. This bearing may be of the ball or roller type. The housing 12 also has a depending collar 16 which forms a central inlet opening, and this inlet opening may be closed by a suitable screw-threaded cap 17. If the well has a hard bottom, the construction shown in Fig. 3 will be used, whereby it is supported by this collar or cap 17. On the other hand, if the well has a soft or sandy bottom, a suitable perforated housing 19 (Fig. 1ª) will be attached to the collar 16 and of a proper length to pass through the sand or soft bottom 18 to a solid formation, for supporting the pumping mechanisms. In this latter instance the inlet openings 14 may be closed by caps 20, or not as the conditions require. Likewise, it will be understood that when the openings 14 are used, they will be provided with suitable screens, not shown, to prevent the entrance of foreign matter into the pumping mechanism.

The screw-receiving barrel 10 is provided with a plurality of spirally arranged openings 21, which have spirally arranged enclosing walls 22 through which the water is forced upward by the screw 11. The top 23 of the screw barrel 10 is concavo-convex, as shown, which prevents the upflowing water from being pocketed, as it would be against a straight top or wall and put an unnecessary strain on the screw and increase the power required to drive the mechanism. By having the convex inner surface 23 at the top by actual practice, the upflowing water does not back up against the top of the barrel 10, but flows freely into the spirally arranged upwardly extending outlet pipes 24, which communicate with the pumping mechanism above.

I also provide means for forcing the water outward between the flanges of the screw 11. This means consists of auxiliary flanges or projections 25, located between the flanges of the screw 11, which serve to throw or expand the water outward and cause it to pass into the spirally arranged outlets 21.

The housing 12 at the bottom of the pumping mechanism A is preferably separated and bolted thereto by suitable bolts 26, which pass through flanges 27 of the screw barrel 10 and flanges 28 of the housing 12, with a division wall 29 between the barrel 10 and the housing 12.

The pumping mechanisms B, C, D, E and F are all constructed like the pumping mechanism A, and a description of the pumping mechanism A applies equally to all the other pumping mechanisms. The pumping mechanisms above A are each at their lower ends provided with a depending frusto-conical vacuum chamber 30, with which the upper ends of the spirally arranged tubes 24 communicate, as shown clearly in Fig. 2. These several pumping mechanisms are held in proper relation by suitable longitudinally extending rods 31, located between the several pumping mechanisms and bolted through their laterally extending flanges 32, which serve to make the structure firm and rigid.

The pumping screws 11 of each of the pumping mechanisms will be of a proper spiral pitch, and their lower edges 33 are sharpened to a knife-edge for the purpose of cutting into and lifting the water with the least possible friction.

The outer lower spirally arranged tubes 24 of the upper pumping mechanism F, communicate with an outlet chamber 34 to which the outlet pipe 35 is connected through which the water flows into the irrigated ditch 36.

An oil supply reservoir 37 is located on top of the housing 4 and communicates with the bearings of the several pumping mechanisms by means of the pipes 38 and 38′. Any suitable hand operated valve (not shown) may or may not be used for controlling the flow of the oil from the reservoir 37.

Located within the housing 4, are a plurality of pressure gauges 39, which correspond in number to the number of pumping mechanisms, and each pressure gauge communicates respectively with one of the pumping mechanisms by the pipes 40, whereby the pressure of the separate pumping mechanisms may be at any time determined, which will enable any inefficiency to be located. It will be understood, of course, that there will be a pressure gauge for each pumping mechanism, and this will vary according to the number of pumping mechanisms used in the well.

The number of pumping mechanisms used in the well will differ according to the depth of the well.

For the purpose of locating any breakage or irregularity in any of the mechanisms, I provide a plurality of telephone communications, separately connected with each pumping mechanism. These telephone mechanisms are diagrammatically shown in Fig. 6, and the receivers shown in Fig. 2. The receivers 41 are electrically connected through batteries 42 with the screw-pumping barrels 10, and the receivers are located on the board 43, which also contain the pressure gauges 39. These telephone systems will be of the ordinary construction, which are well understood and do not need any specific description or further illustration. When the receivers 41 are lifted, the electric connection will be made in the ordinary way, so that the operator can "listen in" upon any of the pumping mechanisms, to determine whether there is any unusual noise in them.

The housing 4 is provided with a suitable door 44 through which access can be had to the instrument board 43.

Attention is directed to the fact that the pumping mechanisms at the lower portion of the well are closer together than those of the upper portion of the well, as indicated by comparison of Figs. 1 and 1ª. By this arrangement, the pumping capacity is increased because there is a shorter distance to lift the water to the mechanism above, which diminishes the amount of water to be handled by the pump mechanism below.

Attention is also directed to the fact that the lower pumping mechanism A is provided with a greater number of spiral outlets 21, and spiral tubes 24 than the mechanism thereabove, whereby this lower pumping mechanism has an increased capacity to supply the water for the pumping mechanisms above, by providing an ample outlet for the water which prevents back pressure and reduces the friction of the water.

By a pump of this construction, water can be lifted from a well of any reasonable depth and with efficiency. The pumping arrangement may be made in sections so that they may be increased or decreased in numbers according to the depth of the well.

My irrigating pump delivers the water in quantity and with force into the pipe 35, and by connecting a hose with this pipe it can advantageously and efficiently be used as a fire-engine to extinguish fires. Especially is this true when the pump is located within hose reach of the house or other buildings on relatively small tracts of land which are being irrigated. The pump will deliver a strong stream of water through a nozzle which will be effective for extinguishing fires.

I do not limit myself to the exact construction and arrangement of parts shown and described herein, as these may be varied by persons skilled in the art without departing from the spirit and scope of my invention, and what I claim is:—

1. A pump of the character described, comprising a plurality of pumping mechanisms located in the well, one above the other, the pumping mechanisms comprising each a barrel and a screw-pump therein, the barrels having spiral outlets and spirally arranged tubes communicating with the outlets of the pumps below and the inlets of the pumps above, and means for simultaneously rotating the pumping screws.

2. A pump of the character described, comprising a plurality of pumping mechanisms arranged in a well, one above the other, the pumping mechanisms each comprising a screw-pump barrel, screw pumps therein, operating mechanism connecting the screws, the pump barrels having outlet openings communicating with the inlet opening of the pump above, the lowest pump having a greater number of outlet openings than the pumps above.

3. A pumping mechanism for the purpose described, comprising a screw-pump barrel, a screw-pump therein, the barrel having a plurality of vertically arranged openings in its wall, the screw having between its flanges means for forcing the water outward, for the purpose described.

4. A pumping mechanism for the purpose described, comprising a screw-pump barrel, a screw-pump therein, the barrel having a plurality of vertically arranged openings in its wall, and auxiliary flanges between the flanges of the screw for forcing the water out through the outlet openings of the barrel.

5. A pumping mechanism of the character described, comprising a screw-pump barrel having a plurality of vertically spirally arranged openings in its wall, the barrel having a top with a convex inner side merging into spirally arranged outlet tubes, for the purpose described.

6. A pumping mechanism for the purpose described, comprising a pump barrel having a bottom with an inlet opening, a screw-pump approximately fitting the barrel with its lower spiral edge at the bottom of the barrel and sharpened for the purpose described, the barrel having vertically and spirally arranged outlet openings.

In testimony whereof I hereunto affix my signature.

CHARLES W. CRANNELL.